Patented Jan. 5, 1954

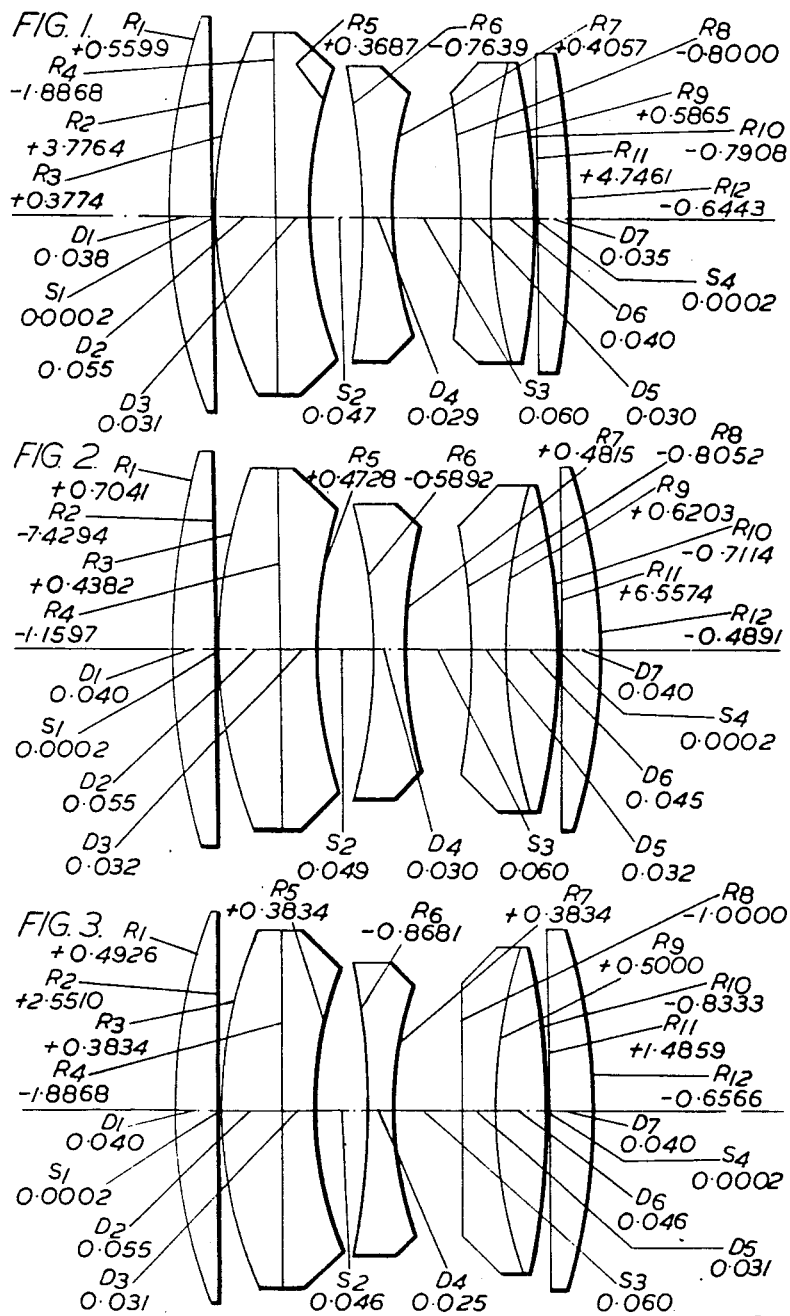

2,664,783

UNITED STATES PATENT OFFICE 2,664,783

FIVE COMPONENT OPTICAL OBJECTIVE WITH THE FRONT THREE COMPONENTS FORMING A DIVERGENT COMBINATION

Gordon Henry Cook, Leicester, England, assignor to Taylor, Taylor & Hobson Limited, Leicester, England, a British company Application July 15, 1952, Serial No. 298,977

Claims priority, application Great Britain April 21, 1952

20 Claims. (Cl. 88—57)

This invention relates to optical objectives for photographic or other purposes, corrected (for a substantial spectrum range including at least a portion of the visible spectrum) for spherical and chromatic aberrations, coma, astigmatism, field curvature and distortion.

One well-known type of objective of this kind, giving a high degree of correction for such aberrations for a relatively high aperture, comprises two compound meniscus components with their concave air-exposed surfaces facing one another and located between two simple convergent outer components. United States Patent No. 2,348,667 relates to a modification of such known objective, giving in addition much improved correction for oblique spherical aberration, by the inclusion of an additional component, namely a simple divergent component located between the two compound meniscus components.

The present invention has for its object to provide an improved objective, covering medium fields at medium relative apertures, and having such good correction for all the aberrations as to give a high degree of performance when made in long focal lengths and when photographing objects containing detail of low contrast. These requirements demand a much better correction for oblique spherical aberration and for skew ray errors than has hitherto been obtained. It is also very desirable for certain applications to provide reasonable freedom from vignetting, and this calls for such good correction of the oblique aberrations as to make it possible to use larger diameters than are required for the axial beam alone.

The objective according to the present invention comprises five components, of which the first and fifth are simple and convergent, and the third is simple and divergent, whilst the second and fourth are convergent meniscus doublet components, having their air-exposed surfaces concave inwards and their internal contact surfaces collective and convex inwards, the equivalent focal length of the divergent combination comprising the front three components being numerically less than 4 F and greater than the radius of curvature of the front surface of the fourth component, which in turn is greater than .5 F, and lies between one quarter and three quarters of the distance of such surface from the virtual image of an infinitely distant object formed by the combination of the front three components, where F is the equivalent focal length of the objective.

It should be made clear that the terms "front" and "rear" are used herein to indicate the sides of the objective respectively nearer to and further from the longer conjugate in accordance with the usual convention.

Conveniently, the overall axial length of the objective from the front surface of the front component to the rear surface of the rear component lies between .3 F and .5 F. The radius of curvature of the front surface of the second component preferably lies between .3 and .5 times the equivalent focal length of the front component.

The radius of curvature of the front surface of the fourth component preferably lies between .2 and .6 times the equivalent focal length of the divergent combination comprising the front three components, such equivalent focal length being numerically greater than 1.5 F.

The power of the internal contact surface in the second component, as defined by the expression $(n^1-n)/R$ where $n^1$ and $n$ are respectively the mean refractive indices of the materials behind and in front of the surface and R is the radius of curvature of the surface, preferably lies between $.03/F$ and $.14/F$, that of the internal contact surface in the fourth component lying between $.09/F$ and $.27/F$.

The radius of curvature of the rear surface of the fourth component conveniently lies between .4 F and that of the front surface of the fifth component.

The equivalent focal lengths of the five components counting from the front may lie respectively between .8 F and 1.3 F, 1.5 F and 4 F, .3 F and .5 F, 1.5 F and 5 F, and .5 F and F.

Figures 1, 2 and 3 of the accompanying drawings respectively illustrate three convenient practical examples of objective according to the invention.

Numerical data for these three examples are given in the following tables, in which $R_1R_2$ . . . represent the radii of curvature of the individual surfaces, the positive sign indicating that the surface is convex to the front and the negative sign that it is concave thereto, $D_1D_2$ . . . represent the axial thicknesses of the various elements, and $S_1S_2$ . . . represent the axial air separations between the components. The tables also give the mean refractive indices for the D-line of the spectrum and the Abbé V numbers of the materials used for the elements of the objective.

The insertion of equals (=) signs in the radius columns of the tables, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negtaive for some calculations as is well understood in the art.

*Example I*

[Equivalent focal length 1.000.   Relative Aperture F/3.5]

| Radius | Thickness or Air Separation | Refractive Index $n_D$ | Abbé V Number |
|---|---|---|---|
| $R_1 = +\ .5599$ | $D_1 = .038$ | 1.63945 | 55.7 |
| $R_2 = +3.7764$ | $S_1 = .0002$ | | |
| $R_3 = +\ .3774$ | $D_2 = .055$ | 1.63945 | 55.7 |
| $R_4 = -1.8868$ | $D_3 = .031$ | 1.53042 | 52.0 |
| $R_5 = +\ .3687$ | $S_2 = .047$ | | |
| $R_6 = -\ .7039$ | $D_4 = .029$ | 1.65348 | 33.5 |
| $R_7 = +\ .4057$ | $S_3 = .060$ | | |
| $R_8 = -\ .8000$ | $D_5 = .030$ | 1.57860 | 41.1 |
| $R_9 = +\ .5865$ | $D_6 = .040$ | 1.71700 | 47.9 |
| $R_{10} = -\ .7908$ | $S_4 = .0002$ | | |
| $R_{11} = +4.7461$ | $D_7 = .035$ | 1.71700 | 47.9 |
| $R_{12} = -\ .6443$ | | | |

In this example the diameters of the five components are respectively .36 F, .33 F, .27 F, .27 F and .29 F, the rear surface $R_5$ of the second component being chamfered off to .26 F and the rear surface $R_7$ of the third component and the front surface $R_8$ of the fourth component to .22 F. The equivalent focal lengths of the five components are respectively 1.02 F, 2.26 F, .40 F, 2.25 F and .79 F, the third component being divergent and the other four convergent. The divergent combination comprising the first three components has equivalent focal length 2.69 F and forms a virtual image of an infinitely distant object at a distance from the surface $R_8$ such that the ratio of the radius $R_8$ to such distance is .40. The overall axial length of the objective is about .365 F. The ratio of the radius $R_3$ to the focal length of the front component is .37. The ratio of the radius $R_8$ to the focal length of the combination of the front three components is .297. The powers of the internal contact surfaces $R_4$ and $R_9$ are respectively about .06/F and .24/F. This example is well corrected over a semi-angular field of 16 degrees.

The foregoing example is corrected for the usual photographic spectrum range, but the second and third examples have been designed for special purposes and are corrected for a spectrum range including the red end of the visible spectrum and a portion of the infra-red range, the best performance being obtained at a wavelength of 768 µ. These two examples also cover a somewhat wider semi-angular field of 23 degrees.

*Example II*

[Equivalent focal length 1.000.   Relative Aperture F/3.5]

| Radius | Thickness or Air Separation | Refractive Index $n_D$ | Abbé V Number |
|---|---|---|---|
| $R_1 = +\ .7041$ | $D_1 = .040$ | 1.60733 | 56.7 |
| $R_2 = -7.4294$ | $S_1 = .0002$ | | |
| $R_3 = +\ .4382$ | $D_2 = .055$ | 1.65100 | 55.8 |
| $R_4 = -1.1597$ | $D_3 = .032$ | 1.54739 | 53.6 |
| $R_5 = +\ .4728$ | $S_2 = .049$ | | |
| $R_6 = -\ .5892$ | $D_4 = .030$ | 1.67270 | 32.2 |
| $R_7 = +\ .4815$ | $S_3 = .060$ | | |
| $R_8 = -\ .8052$ | $D_5 = .032$ | 1.57309 | 42.7 |
| $R_9 = +\ .6203$ | $D_6 = .045$ | 1.65844 | 50.8 |
| $R_{10} = -\ .7114$ | $S_4 = .0002$ | | |
| $R_{11} = +6.5574$ | $D_7 = .040$ | 1.61272 | 58.6 |
| $R_{12} = -\ .4891$ | | | |

*Example III*

[Equivalent focal length 1.000.   Relative Aperture F/3.5]

| Radius | Thickness or Air Separation | Refractive Index $n_D$ | Abbé V Number |
|---|---|---|---|
| $R_1 = +\ .4926$ | $D_1 = .040$ | 1.58913 | 61.2 |
| $R_2 = +2.5510$ | $S_1 = .0002$ | | |
| $R_3 = +\ .3834$ | $D_2 = .055$ | 1.63854 | 55.5 |
| $R_4 = -1.8868$ | $D_3 = .031$ | 1.52944 | 51.8 |
| $R_5 = +\ .3834$ | $S_2 = .046$ | | |
| $R_6 = -\ .8681$ | $D_4 = .025$ | 1.67270 | 32.2 |
| $R_7 = +\ .3834$ | $S_3 = .060$ | | |
| $R_8 = -1.0000$ | $D_5 = .031$ | 1.57309 | 42.7 |
| $R_9 = +\ .5000$ | $D_6 = .046$ | 1.65844 | 50.8 |
| $R_{10} = -\ .8333$ | $S_4 = .0002$ | | |
| $R_{11} = +1.4859$ | $D_7 = .040$ | 1.60982 | 53.3 |
| $R_{12} = -\ .6566$ | | | |

In both these examples the diameters of the five components are respectively .36 F, .33 F, .27 F, .30 F and .33 F, the chamfers on the surfaces $R_5$, $R_7$ and $R_8$ having diameters .26 F, .23 F and .23 F respectively. The equivalent focal lengths of the five components in Example II are respectively 1.07 F, 1.99 F, .40 F, 2.63 F and .75 F, that of the divergent combination of the front three components being 2.28 F, whilst the corresponding figures in Example III are 1.04 F, 2.18 F, .40 F, 2.46 F and .76 F, and 2.54 F. The ratio of the radius $R_8$ to the distance from $R_8$ of the virtual image of an indfinitely distant object formed by the combination of the front three components is .46 in Example II and .53 in Example III. The overall axial length of the objective is about .383 F in Example II and .374 F in Example III.

The ratio of the radius $R_3$ to the focal length of the front component is .41 in Example II and .37 in Example III. The ratio of the radius $R_8$ to the focal length of the combination of the front three components is about .35 in Example II and .39 in Example III.

The powers of the internal contact surfaces $R_4$ and $R_9$ in example II are respectively .09/F and .14 F, the corresponding figures for Example III being .06/F and .17/F.

What I claim as my invention and desire to secure by Letters Patent is:

1. An optical objective for photographic or other purposes, corrected (for a substantial spectrum range including at least a portion of the visible spectrum) for spherical and chromatic aberrations, coma, astigmatism, field curvature and distortion, and comprising five components, of which the first and fifth are simple and convergent and the third is simple and divergent, whilst the second and fourth are convergent meniscus doublet components having their air-exposed surfaces concave inwards and their internal contact surfaces collective and convex inwards, the equivalent focal length of the divergent combination comprising the front three components being numerically less than 4 F and greater than F, whilst the radius of curvature of the front surface of the fourth component lies between .5 F and such equivalent focal length and also lies between one quarter and three quarters of the distance of such surface from the virtual image of an infinitely distant object formed by the combination of the front three components, where F is the equivalent focal length of the objective.

2. An optical objective as claimed in claim 1, in which the radius of curvature of the front surface of the fourth component lies between .2 and .6 times the equivalent focal length of the divergent combination comprising the front three components, such equivalent focal length being numerically greater than 1.5 F.

3. An optical objective as claimed in claim 2, in which the powers of the internal contact surfaces in the second and fourth components respectively lie between .03/F and .14/F, and between .09/F and .27/F.

4. An optical objective as claimed in claim 3, in which the radius of curvature of the rear surface of the fourth component lies between .4 F and that of the front surface of the fifth component.

5. An optical objective as claimed in claim 1, in which the powers of the internal contact surfaces in the second and fourth components respectively lie between .03/F and .14/F, and between .09/F and .27/F.

6. An optical objective as claimed in claim 1, in which the radius of curvature of the rear surface of the fourth component lies between .4 F and that of the front surface of the fifth component.

7. An optical objective as claimed in claim 1, in which the equivalent focal lengths of the five components counting from the front lie respectively between .8 F and 1.3 F, 1.5 F and 4 F, .3 F and .5 F, 1.5 F and 5 F and .5 F and F.

8. An optical objective for photographic or other purposes, corrected (for a substantial spectrum range including at least a portion of the visible spectrum) for spherical and chromatic aberrations, coma, astigmatism, field curvature and distortion, and comprising five components, of which the first and fifth are simple and convergent and the third is simple and divergent, whilst the second and fourth are convergent meniscus doublet components having their air-exposed surfaces concave inwards and their internal contact surfaces collective and convex inwards, the equivalent focal length of the divergent combination comprising the front three components being numerically less than 4 F and greater than F, whilst the radius of curvature of the front surface of the fourth component lies between .5 F and such equivalent focal length and also lies between one quarter and three quarters of the distance of such surface from the virtual image of an infinitely distant object formed by the combination of the front three components, the overall length of the objective from the front surface of the front component to the rear surface of the rear component lying between .3 F and .5 F, where F is the equivalent focal length of the objective.

9. An optical objective as claimed in claim 8, in which the radius of curvature of the front surface of the second component lies between .3 and .5 times the equivalent focal length of the front component.

10. An optical objective as claimed in claim 9, in which the radius of curvature of the front surface of the fourth component lies between .2 and .6 times the equivalent focal length of the divergent combination comprising the front three components, such equivalent focal length being numerically greater than 1.5 F.

11. An optical objective as claimed in claim 8, in which the radius of curvature of the front surface of the fourth component lies between .2 and .6 times the equivalent focal length of the divergent combination comprising the front three components, such equivalent focal length being numerically greater than 1.5 F.

12. An optical objective as claimed in claim 8, in which the powers of the internal contact surfaces in the second and fourth components respectively be between .3/F and .14/F, and between .09/F and .27/F.

13. An optical objective as claimed in claim 8, in which the radius of curvature of the rear surface of the fourth component lies between .4 F and that of the front surface of the fifth component.

14. An optical objective as claimed in claim 8, in which the equivalent focal lengths of the five components counting from the front lie respectively between .8 F and 1.3 F, 1.5 F and 4 F, .3 F and .5 F, 1.5 F and 5 F and .5 F and F.

15. An optical objective for photographic or other purposes, corrected (for a substantial spectrum range including at least a portion of the visible spectrum) for spherical and chromatic aberrations, coma, astigmatism, field curvature and distortion, and comprising five components, of which the first and fifth are simple and convergent and the third is simple and divergent, whilst the second and fourth are convergent meniscus doublet components having their air-exposed surfaces concave inwards and their internal contact surfaces collective and convex inwards, the equivalent focal length of the divergent combination comprising the front three components being numerically less than 4 F and greater than F, whilst the radius of curvature of the front surface of the fourth component lies between .5 F and such equivalent focal length and also lies between one quarter and three quarters of the distance of such surface from the virtual image of an infinitely distant object formed by the combination of the front three components, where F is the equivalent focal length of the objective, the radius of curvature of the front surface of the second component lying between .3 and .5 times the equivalent focal length of the front component.

16. An optical objective as claimed in claim 15, in which the radius of curvature of the front surface of the fourth component lies between .2 and .6 times the equivalent focal length of the divergent combination comprising the front three components, such equivalent focal length being numerically greater than 1.5 F.

17. An optical objective as claimed in claim 16, in which the powers of the internal contact surfaces in the second and fourth components respectively lie between .03/F and .14/F, and between .09/F and .27/F.

18. An optical objective as claimed in claim 15, in which the powers of the internal contact surfaces in the second and fourth components respectively lie between .03/F and .14/F, and between .09/F and .27/F.

19. An optical objective as claimed in claim 15, in which the radius of curvature of the rear surface of the fourth component lies between .4 F. and that of the front surface of the fifth component.

20. An optical objective as claimed in claim 15, in which the equivalent focal lengths of the five components counting from the front lie respectively between .8 F and 1.3 F, 1.5 F and 4 F, .3 F and .5 F, 1.5 F and 5 F and .5 F and F.

GORDON HENRY COOK.

References Cited in the file of this patent

UNITED STATES PATENTS

| Number | Name | Date |
| --- | --- | --- |
| 871,559 | Beck et al. | Nov. 19, 1907 |
| 1,839,011 | Bielicke | Dec. 29, 1931 |
| 2,106,077 | Tronnier | Jan. 18, 1938 |
| 2,348,667 | Warmisham | May 9, 1944 |
| 2,528,212 | Cook | Oct. 31, 1950 |